March 19, 1935.   W. D. BURGIN   1,994,906
NUT SHELLING MACHINE
Filed March 25, 1933
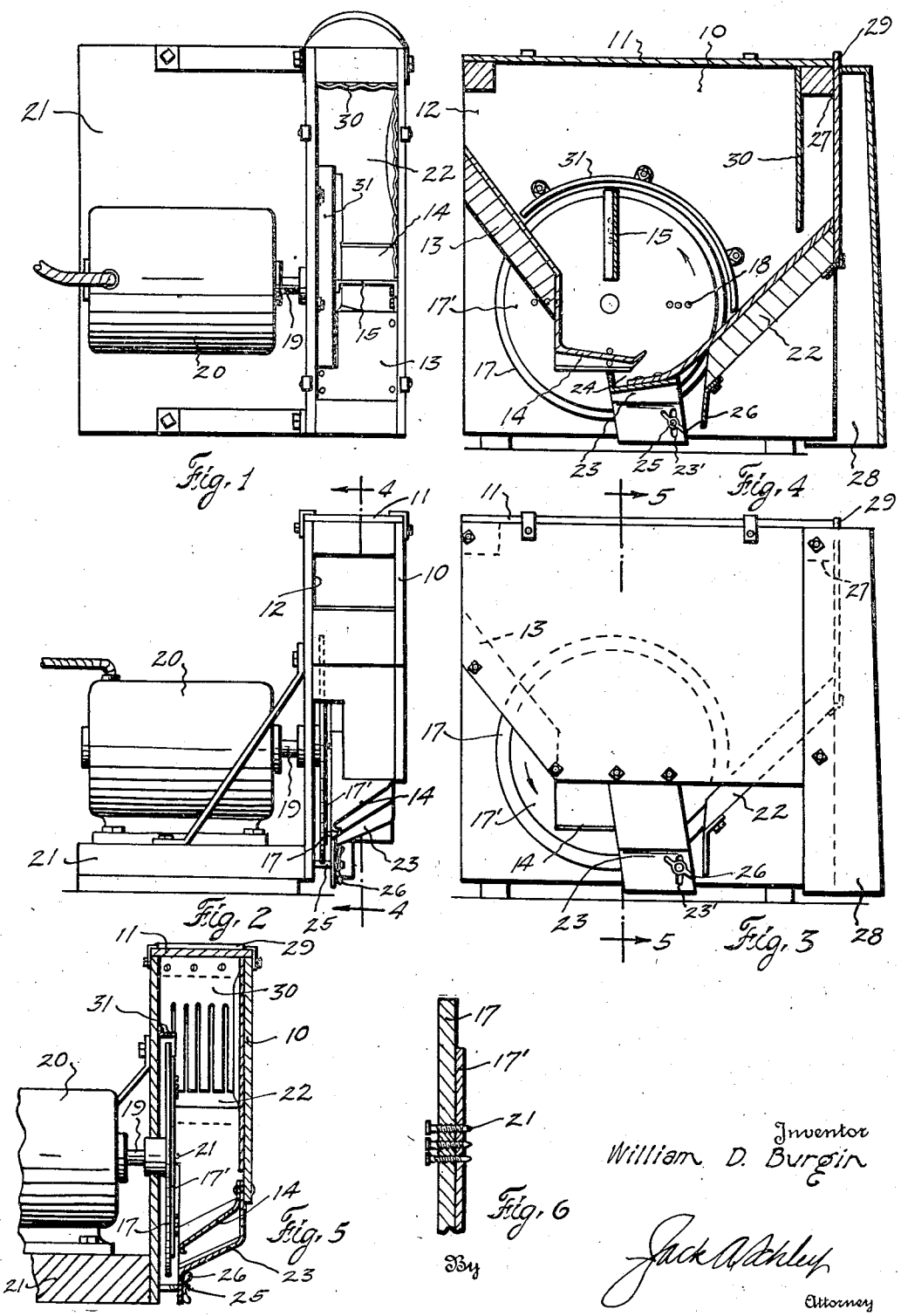

Patented Mar. 19, 1935

1,994,906

UNITED STATES PATENT OFFICE 1,994,906

NUT SHELLING MACHINE

William D. Burgin, Dallas, Tex.

Application March 25, 1933, Serial No. 662,686

5 Claims. (Cl. 146—8)

This invention relates to new and useful improvements in nut shelling machines.

One object of the invention is to provide an improved machine, into which cracked nuts may be introduced and wherein the kernels and shells will be separated.

Another object of the invention is to provide an improved machine for shelling cracked nuts having means for whirling and beating said cracked nuts, whereby the natural adhesion of the kernel to the shell is disrupted.

A further object of the invention is to provide an improved machine for shelling cracked nuts which will be cheap and inexpensive to manufacture and efficient in operation.

Still another object of the invention is to provide an improved machine for shelling cracked nuts having means for preventing an uncracked nut, which may enter the machine accidentally, from passing therethrough and escaping with the separated kernels and shells.

A further object of the invention is to provide an improved machine for shelling cracked nuts having an adjustable outlet, whereby the kernels cannot escape therefrom unless separated from the shells.

A still further object of the invention is to provide an improved nut shelling machine including a revoluble disk having a facing of flexible material and having a plurality of pins extending therethrough, said disk being so positioned that cracked nuts entering the machine engage the facing on the same, and the pins extending through the disk engage the fractures of the shells, whereby the cracked nuts are cast upwardly, this casting causing the separation of the kernels and shells.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a plan view of a nut shelling machine constructed in accordance with the invention, Figure 2 is a side elevation of the same, Figure 3 is a front elevation of the machine, Figure 4 is a vertical sectional view taken on the line 4—4 of Figure 2, Figure 5 is a transverse vertical sectional view taken on the line 5—5 of Figure 3, and Figure 6 is a detail of the agitating pins.

This application is a continuation in part of my copending application Serial No. 582,484, filed December 21, 1931.

In the drawing the numeral 10 designates a hopper which has its top closed by a sliding cover 11. The hopper may be made of wood, metal, or any material suitable for the purpose.

An opening 12 is provided at one side of the hopper near its upper end and an inclined chute 13 extends therefrom. Cracked nuts are introduced into the hopper through this opening and slide or roll down the inclined chute 13 and fall onto an inclined deck 14. The deck is positioned at an angle inclining downwardly toward the rear of the hopper, as is shown in Figure 2. A vertical guard plate 15 is positioned transversely within the hopper and prevents nuts, which enter the hopper, from bouncing over the deck 14, thereby causing each nut which enters the hopper to fall onto said deck.

A disk 17 is mounted to revolve within the hopper. A circular facing of rubber, felt, or other flexible material 17', and smaller in diameter than the disk, is secured to the inner face of said disk. Adjustable pins 18 extend through the disk 17 and its facing 17' and have their inner ends projecting into the hopper 10. The position of the pins on the disk is immaterial and they may be positioned at any point or points thereon, so long as their inner ends extend into the hopper.

The disk 17 is fastened on the shaft 19, which extends through the rear wall of the hopper, of an electric motor 20 and is rotated thereby. The motor is supported on a base 21 which also supports the hopper 10. The disk rotates in a counterclockwise direction and it is to be understood that the means for driving the disk is not to be limited to an electric motor, as any suitable driving means may be employed.

The cracked nuts which are introduced into the hopper through the opening 12, will roll down the inclined chute 12 and will fall onto the inclined deck 14. This rolling action will tend to loosen the meats and shells of said nuts. Due to the inclination of the deck 14, the nuts will fall against the facing 17' of the disk 17, which is revolving in a counterclockwise direction. The angle of the deck 14 is sufficient to cause the nuts to fall against the disk but is not at such an angle to said disk that the pieces of the shells and kernels will wedge between said disk and the deck. The facing 17' being of flexible material, will engage the nuts and cast them upwardly. The engagement of the nuts with this flexible facing will tend to give the nuts a top-like spinning motion which will cause said nuts to burst or separate by centrifugal force. At the same time the facing engages the nuts, the pins 18 will engage the fractures in the shells and will tend, not only to cast the nuts upwardly, but to disengage the shell from the kernels. It is noted that the ends of the pins extend into the hopper a sufficient distance to engage only the shells, whereby the danger of the pins injuring the kernels, or meats, is eliminated. The adjustability of said pins provides for their being in proper position at all times. The spinning motion given the nuts by their engagement with the facing causes the pins to be more likely to engage the shell than the kernel, thereby further preventing injury to said kernel.

When the nuts are cast upwardly, as has just been explained, by the revolving disk 17, they will fall on the opposite inclined side 22 of the hopper. This casting and falling of the nuts will further dislodge the pieces of cracked shell from the kernels. The nuts will then roll down the inclined side 22 and onto a lower deck 23, which is positioned below the deck 14. The deck 23 is similar to the deck 14, being inclined downwardly toward the disk 17 (Figures 2 and 5).

The separated kernels and pieces of shell will fall to the deck 23 in the space provided between the upper deck 14 and the deck 23. The pieces will then roll down the inclined deck 23 and escape from the machine through the space 24 provided between the rear edge of said deck and the disk 17. The outer edge of the disk 17 beyond the facing 17' is smooth and polished so as to prevent agitation and to more readily permit the escape of the separated pieces.

The space 24 is only large enough to admit the separated kernels and pieces of shell. This space is sufficiently large to admit the whole kernel, but the shell must be broken into small pieces before it can enter the space. Thus, if a portion of a nut is not completely separated it cannot enter said space between the rear edge of the deck 23 and the disk and it will again fall against the disk 17, where it is again cast upwardly onto the inclined side 22. It is obvious that this action will be repeated until the shell of each nut is completely separated from the kernel, at which time the pieces will fall on the deck 23 and will then escape from the machine through the space 24. The lower deck 23 has a slot 23' therein, which is engaged by a bolt 25 extending outwardly from the base 21. Thus, the deck 23 may be swung to vary the space between the rear edge of the deck and the disk to control the size of the pieces which escape from the machine. A wing nut 26 on the outer end of the bolt 25 holds the deck in adjusted positions.

For preventing an uncracked nut, which may be accidentally dropped into the machine, from passing therethrough, I provide an opening 27 at the upper end of the inclined side 22. This opening has connection with an outlet chute 28, but is normally closed by a vertical slide 29. Rubber fingers 30 are positioned transversely within the hopper and cover the inner side of the opening 27.

When an uncracked nut enters the machine, the slide 29 is raised. The uncracked nut rolls down the inclined chute 13 with the cracked nuts and falls on the deck 14. From here it is cast upwardly by the disk 17, against the rubber fingers 30. The weight of a whole nut is sufficient to brush aside the fingers to allow the nut to pass through the opening 27 and escape through the outlet chute 28. The fingers are sufficiently strong, however, to prevent portions of the separated shells and kernels from passing therethrough. A guard plate 31 extends over the disk 17 from the inclined chute 13 to the inclined side 22 of the hopper to prevent the nuts cast upwardly by said disk, from falling behind the same and retarding the efficiency of the machine.

Only a few cracked nuts are admitted to the machine at one time, as the separation of the shells from the kernels depends on the agitation of the same caused by the rolling, falling and casting actions. If a large number of nuts were introduced into the machine they would interfere with each other and sufficient agitation could not be had.

The description which has been given, recites more or less detail of a particular embodiment of the invention, which is set forth as new and useful; however, I desire it understood that the invention is not limited to such exact details of construction, because it is manifest that changes and modifications may be made, within the scope of the appended claims, without departing from the spirit of the invention.

What I claim and desire to secure by Letters Patent, is:

1. A nut shelling machine comprising, a hopper having an upper inclined deck for receiving cracked nuts, a revolving member having adjustable pins on its face for engaging the fractures of the shells of the cracked nuts, a lower inclined deck beneath the upper deck, the latter being at an angle of approximately 45 degrees with relation to the face of the member so as to support the nuts without wedging the same against the face of said member, the lower inclined deck being at substantially the same angle as the upper inclined deck, the pins on the face of the revolving member serving to cast the cracked nuts upwardly from the upper inclined deck to separate the meats from the shells, the separated meats and shells falling onto the lower inclined deck and discharging through the space between the decks, and means for raising and lowering the lower inclined deck, whereby the space between the decks is varied.

2. A nut shelling machine comprising, a hopper having an inclined bottom for receiving cracked nuts, a revolving member within the hopper having rigid surface projections for engaging the fractures of the shells of the nuts introduced into the hopper to cast the nuts upwardly, the inclined bottom being at an angle of approximately 45 degrees with relation to the face of the revolving member, whereby nuts may be supported on said bottom without wedging against the face of said member, means for controlling the size of the discharge opening of the hopper to permit the separate shells and meats of the nuts to pass therefrom, and a vertical chute at one side of the hopper and communicating with the interior thereof for receiving any uncracked nuts which accidentally enter the hopper.

3. A nut shelling machine comprising, a hopper for receiving cracked nuts, and a revolving member having surface projections rotating on a horizontal axis within the hopper and forming one side of said hopper, the latter having its bottom sloping downwardly toward the face of the revolving member at an angle of substantially 45 degrees, whereby cracked nuts introduced into the hopper and supported on said bottom will not wedge against the face of the member, the slope of said bottom feeding the nuts against the face of the member so that the projections thereon will engage the fractures of said nuts to toss the nuts upwardly and permit them to fall onto the hard inclined side of the hopper to promote separation of the meats and shells.

4. A nut shelling machine comprising, a hopper, a revolving member having surface projections rotating on a horizontal axis within the hopper and forming the rear side of said hopper, the latter having an upper deck sloping downwardly toward the face of the revolving member at substantially an angle of 45 degrees for receiving cracked nuts introduced into the hopper, the slope of said deck feeding the nuts against the face of the revolving member so that the surface projections thereon will engage the fractures of the shells of the nuts to cast said nuts upwardly from the sloping deck to permit them to fall onto the hard inclined side of the hopper to cause separation of the meats from the shells, a lower deck positioned beneath the upper deck at the bottom of the hopper and sloping at substantially the same angle with relation to the upper deck, means for adjusting the lower deck with relation to the upper deck whereby the space between the decks is varied to control the size of the particles entering between the decks.

5. A nut shelling machine comprising, a hopper for receiving cracked nuts, and a revolving member having a facing of flexible material and also having rigid pins extending therethrough rotating on a horizontal axis within the hopper and forming one side of said hopper, the latter having its bottom sloping downwardly toward the face of the revolving member at an angle of substantially 45 degrees, whereby cracked nuts introduced into the hopper and supported on said bottom will not wedge against the face of the member, the slope of said bottom feeding the nuts against the face of the member so that the projections thereon will engage the fractures of said nuts to toss the nuts upwardly and permit them to fall onto the hard inclined side of the hopper to promote separation of the meats and shells.

WILLIAM D. BURGIN.